(12) United States Patent  
Rumreich

(10) Patent No.: US 7,499,112 B2  
(45) Date of Patent: Mar. 3, 2009

(54) METHOD AND APPARATUS FOR IMAGE CORRECTION

(75) Inventor: Mark Francis Rumreich, Indianapolis, IN (US)

(73) Assignee: TTE Technology, Inc., Indianapolis, IN (US)

(*) Notice: Subject to any disclaimer, the term of this patent is extended or adjusted under 35 U.S.C. 154(b) by 0 days.

(21) Appl. No.: 12/143,307

(22) Filed: Jun. 20, 2008

(65) Prior Publication Data

US 2008/0253677 A1   Oct. 16, 2008

Related U.S. Application Data

(63) Continuation of application No. 11/197,069, filed on Aug. 4, 2005, now Pat. No. 7,408,595.

(51) Int. Cl.
*H04N 3/22* (2006.01)
*H04N 3/26* (2006.01)

(52) U.S. Cl. .................. 348/745; 348/806

(58) Field of Classification Search ......... 348/745–747, 348/806, 807, 180, 184, 189, 191; 315/368.13, 315/370; 345/647, 660, 671; *H04N 3/22, H04N 3/26, 3/223, 3/23*
See application file for complete search history.

(56) References Cited

U.S. PATENT DOCUMENTS 5,111,284 A    5/1992   Tsujhara et al.
5,592,240 A *  1/1997   Sakamoto et al. ........... 348/807
6,310,650 B1  10/2001   Johnson et al.

FOREIGN PATENT DOCUMENTS

EP   1550979 A1   7/2005

OTHER PUBLICATIONS

PCT Search Report and Written Opinion, dated Aug. 14, 2006, pp. 9.

* cited by examiner

*Primary Examiner*—Sherrie Hsia
(74) *Attorney, Agent, or Firm*—Fletcher Yoder

(57) ABSTRACT

Present embodiments are directed to a system and method for correcting video image distortion in a video system. An exemplary embodiment includes steps or features for retrieving baseline measurements for set portions of a display area, wherein the baseline measurements take into account distortions detected in the video system. Further, the exemplary embodiment includes determining stretch coefficients for the set portions of the display area, retrieving an image corresponding to the display area, and correcting positioning of a plurality of pixels of the image based on the baseline measurements and the stretch coefficients.

20 Claims, 5 Drawing Sheets

METHOD AND APPARATUS FOR IMAGE CORRECTION

FIELD OF THE INVENTION

The present invention relates generally to projecting video images onto a screen. More specifically, the present invention relates to system and method for correcting video images projected onto a screen.

BACKGROUND OF THE INVENTION

This section is intended to introduce the reader to various aspects of art, which may be related to various aspects of the present invention that are described and/or claimed below. This discussion is believed to be helpful in providing the reader with background information to facilitate a better understanding of the various aspects of the present invention. Accordingly, it should be understood that these statements are to be read in this light, and not as admissions of prior art.

Projection televisions create video images by varying the color and shade of projected light. One example of a projection television system is a liquid crystal display ("LCD") projection television. Another example of a projection television system is a Digital Light Processing ("DLP") system. DLP systems employ an optical semiconductor, known as a Digital Micromirror Device ("DMD") to project video onto a screen. DMDs typically contain an array of at least one million or more microscopic mirrors mounted on microscopic hinges. Each of these mirrors is associated with a point on the screen, known as a pixel. By varying the amount of light that is reflected off each of these mirrors, it is possible to project video images onto the screen. However, the lenses and mirrors needed to project video onto a screen results in distortion of the final image. Geometric distortion can be caused by projecting an image on a non-planar wall or at an angle. Geometric distortion can also occur in a cascade of lenses and mirrors used in the optical path of light-engine-based televisions.

Conventionally, a pixel-based form of electronic geometry correction is used. In this form, the pixel data itself is manipulated via resampling to achieve the desired geometric correction. The pixels are configured to project a corrected image with error relative to an idealized grid. In other words, along the lines of the idealized grid, the image should appear to be linear along a vertical and horizontal axis. However, due to distortions in the mirrors that reflect light to form images, the lenses used to project these same images, and other design factors, the uncorrected images may appear to be distorted and be curved along the vertical and horizontal axis.

One method of correction is referred to herein as the "offset method." The offset method attempts to correct for arbitrary or near-arbitrary forms of distortion in a computation-intensive manner. A large number of offset coefficients are employed to compute a corrected image position for pixels relative to an expected position at which pixels would be displayed. The expected position, which may be determined by actual measurement data, may be attributable to a large number of physical factors relating to the design of the system.

In application of the offset method, the display area is divided into a fine grid and horizontal and vertical offset coefficients are specified at each of the grid points. Because it employs a large number of coefficients, response time to changes in system parameters may be relatively slow because of the coefficient transfer time required to manifest the changes. The offset method also typically requires smoothing to reduce the visibility of warping transitions between grid points.

A second method of electronic geometry correction employs coefficients that describe a high-order polynomial in horizontal and vertical directions. This method, which is referred to herein as the "polynomial method," reduces the number of coefficients required to specify a particular geometric correction and provides inherently smooth transitions of warping on the screen. However, it is difficult to calculate the coefficients required to correct a particular arbitrary distortion and it requires sophisticated hardware to implement the actual correction to the pixel data. Also, this method employs fewer grid points and is, accordingly, does not allow as fine a correction capability as the offset method described above. A simpler method that would not require so much hardware, memory, and computing power while still providing an acceptable level of distortion correction is desirable.

SUMMARY OF THE INVENTION

Certain aspects commensurate in scope with the disclosed embodiments are set forth below. It should be understood that these aspects are presented merely to provide the reader with a brief summary of certain forms the invention might take and that these aspects are not intended to limit the scope of the invention. Indeed, the invention may encompass a variety of aspects that may not be set forth below.

The disclosed embodiments relate to a system and method for correcting a video image. In an exemplary embodiment, an image processing unit comprises an image offset generator configured to calculate a baseline measurement for a first display location of a plurality of display locations, a stretch coefficient generator configured to calculate a stretch coefficient relative to a neighboring display location for a remainder of the plurality of display locations, and an image correction processor configured to correct a default display location of each of the plurality of display locations using the baseline measurement for the first display location and the stretch coefficient for the remainder of the plurality of display locations.

BRIEF DESCRIPTION OF THE DRAWINGS

Advantages of the invention may become apparent upon reading the following detailed description and upon reference to the drawings in which.

DETAILED DESCRIPTION

One or more specific embodiments of the present invention will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Figure 1:
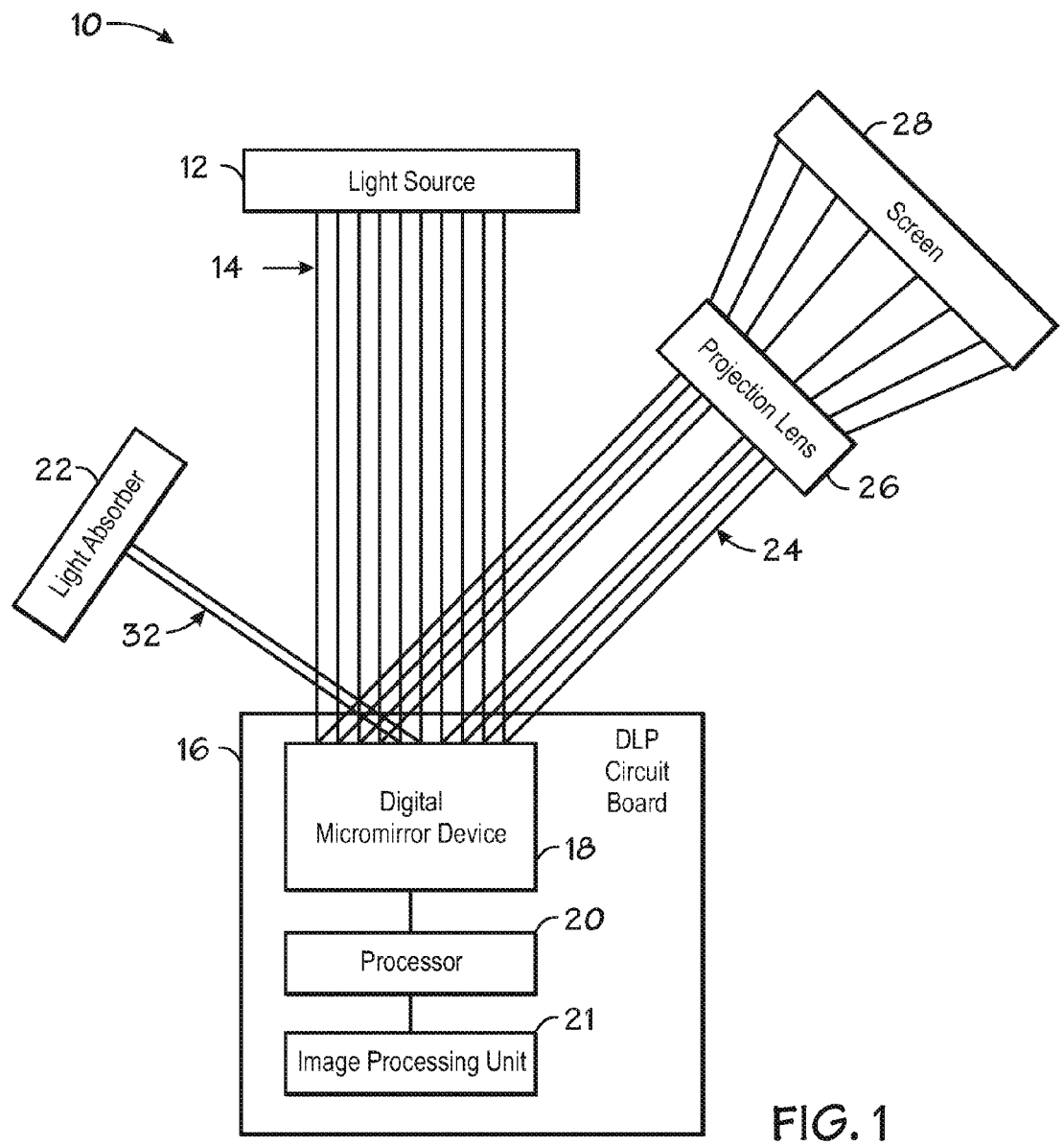
FIG. 1 is a block diagram of a video unit employing an image corrector in accordance with embodiments of the present invention.

FIG. 1 is a block diagram of a video unit employing an image corrector in accordance with embodiments of the present invention. In one embodiment, the video unit 10 comprises a Digital Light Processing ("DLP") projection television. In another embodiment, the video unit 10 may comprise a DLP-based video or movie projector. In still another embodiment, the video unit 10 may comprise another form of projection television or projection display, such as a Liquid Crystal Display ("LCD") projection television.

The video unit 10 may comprise a light source 12. The light source 12 may comprise any suitable form of lamp or bulb capable of projecting white or generally white light 14. In one embodiment, the light source 12 may include a metal halide, mercury vapor, or ultra high performance ("UHP") lamp. In one embodiment, the light source 12 may include at least one LED. In one embodiment, the light source 12 is configured to project, shine, or focus the white light 28 into one static location, such as a digital micromirror device ("DMD") 18 as described further below.

As illustrated, the light source 12 may project, shine, or focus colored light 14 at the DMD 18. The DMD 18 may be located on a DLP circuit board 16 arrayed within an optical line of sight of the light source 12. The DLP circuit board 16 may comprise the DMD 18, a processor 20, and an image processing unit 21. As described above, the DMD 18 may comprise up to one million or more micromirrors mounted on microscopic, electrically-actuated hinges that enable the micromirrors to tilt between an "on" position and an "off" position. In the illustrated embodiment, the DMD 18 is coupled to the processor 20. In one embodiment, the processor 20 receives a video input and directs the micromirrors on the DMD 18 to turn on or off, as appropriate to create the video image.

Figure 2:
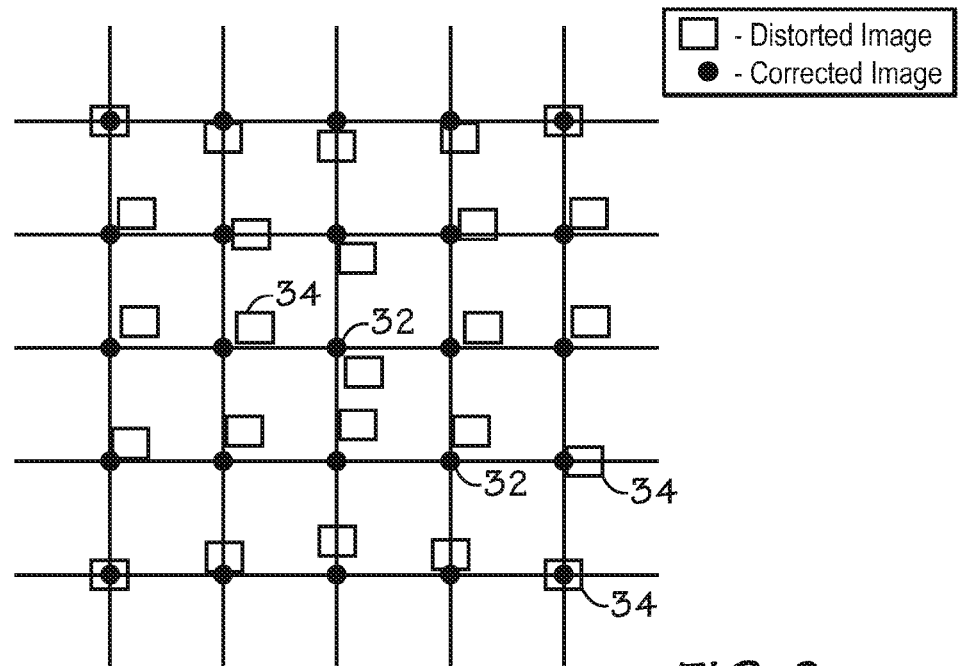
FIG. 2 is a graphical representation illustrating a distorted image and a corrected image.

FIG. 2 is a graphical representation illustrating a distorted image and a corrected image. Under ideal conditions, the pixels displayed on a screen would be positioned according to an ideal grid having ideal grid points 32. Due to a number of design factors, such as the number of lenses and mirrors in a DLP system, the image actually projected often becomes distorted. This distortion is illustrated as distorted image points 34 in FIG. 2. As is apparent from FIG. 2, the points of distorted image 34 form a line that curves instead of remaining straight. It is the object of the present invention to reduce the distortion of the distorted image 34 by correcting pixel placement to produce the corrected image 32.

Some distortion may be inherent in the design of a video system and may be present in the system at the factory when the system is manufactured. Additional distortion may result from sagging mirrors and other factors as the system ages. Therefore, an embodiment of the image correction of the present invention can be used as part of the manufacturing process to minimize image distortion experienced by the consumer.

Embodiments of present invention employ stretch coefficients to correct pixel locations. To facilitate the use of stretch coefficients, the display area is divided into a grid. For a 720×1280 screen, if one were to divide the screen into grid blocks of 20×20 pixels, the resulting grid would contain 36×64 blocks. Stretch coefficients may be calculated and stored for every grid point in this grid instead of at every pixel. The use of coefficients corresponding to grid locations rather than the larger number of pixels decreases the number of coefficients. As explained below, stretch coefficients may represent a difference in desired location of a pixel relative to a neighboring grid point rather than an absolute location on the grid. Accordingly, a typical stretch coefficient corresponds to a smaller number than a full offset. Thus, fewer bits (and less memory) may be needed to employ stretch coefficients.

Embodiments of the present invention may employ a combination of baseline measurements and stretch coefficients to correct pixel positions. An exemplary baseline measurement may be an offset coefficient. The term "offset coefficients" as used herein refers to a set of coefficients that define absolute locations on a grid corresponding to a display. The term "stretch coefficients" as used herein refers to a set of coefficients that employ a relative difference in the horizontal and vertical directions compared to a neighboring coefficient. Offset coefficients, because they embody absolute position information, typically require a relatively large number of bits to define. Stretch coefficients, which define a difference between a neighboring coefficient and a present coefficient, require a correspondingly smaller number of bits to define.

By way of example, a display that comprises a resolution of 1280 pixels by 720 pixels would require offset coefficients sufficiently large to express the worst case error in the vertical and horizontal directions for each pixel, which may include fractional numbers. If stretch coefficients are used, each grid point's stretch coefficient, with the exception of a first grid point, is the difference between the offset of the current grid point and the offset of the neighboring grid point. In one embodiment of the invention, the stretch coefficient of the first grid point is the offset of the first grid point.

For example, an offset coefficient may be determined for each leftmost point on each horizontal row for a given display. This offset coefficient is referred to herein as an anchoring offset coefficient. The anchoring offset coefficient may be adjusted to produce a corrected absolute location based on measured parameters of a specific device. Corrections to subsequent grid positions on the horizontal row may be expressed as stretch coefficients that are computed by measuring corrected grid locations in the horizontal and vertical directions relative to the neighboring grid point coefficient. In this example, the stretch coefficient for the second grid location on each row would represent a positional difference relative to the anchoring offset coefficient for that row. Subsequent stretch coefficients for the row would represent differences relative to the neighboring stretch coefficient.

When an image is to be displayed, the image is received and compared to the expected distortion embodied in the grid coefficients that are stored in memory. The appropriate stretch coefficients are retrieved for the image pixel to be corrected. If the desired pixel to be corrected is located in between grid points, and does not already have a stretch coefficient set for it, its stretch coefficient can be interpolated from the coefficients for its surrounding grid points.

The stretch method of geometric correction, in accordance with an embodiment of the present invention, is preferable to previous implementations of geometric correction in that it requires less bit size when storing the coefficients. As this method requires fewer bits, there will be less data transfer time lag between when a command is issued to correct the distortion and when the display actually reflects the correction. When a user manually corrects a distortion of the system, the system has to process the entered parameters and adjust the image accordingly. For the offset method, this includes transferring a larger number of coefficient bits, which would take a long period of time before the user is able to see an adjustment in the display image. The stretch method described herein also provides a greater degree of distortion correction than the polynomial method.

Figure 3:
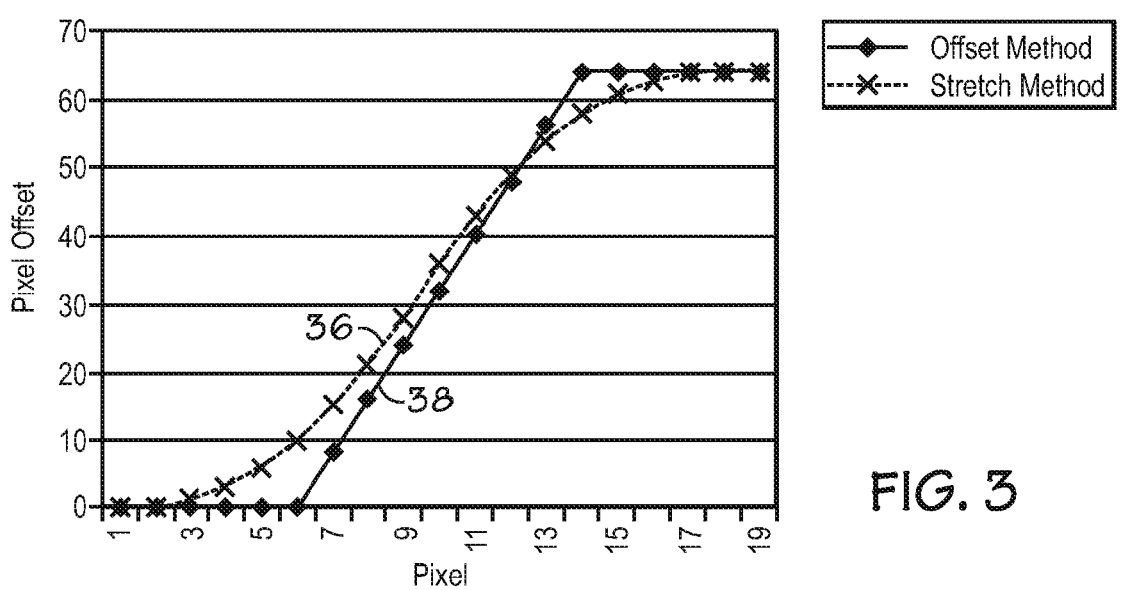
FIG. 3 is a graph illustrating the inherent smoothing characteristics of an embodiment of the present invention as compared with an offset method of image correction.

Another benefit of the stretch coefficient method is that the stretch coefficients represent a rate of change of the image offsets; the resulting corrected image geometry is inherently smoothed without a need for smoothing circuitry. As illustrated in FIG. 3, the stretch method 36 of the present invention does not result in a piecewise linear function appearance like the offset method does. This reduces the need for any additional smoothing circuitry to remove piecewise linear image geometries from the displayed image. In one embodiment of the present invention, this smoothing is possible because to create the corrected image, the offset information is regenerated by integrating the stretch coefficient. This integration process produces the inherent smoothing.

Figure 4:
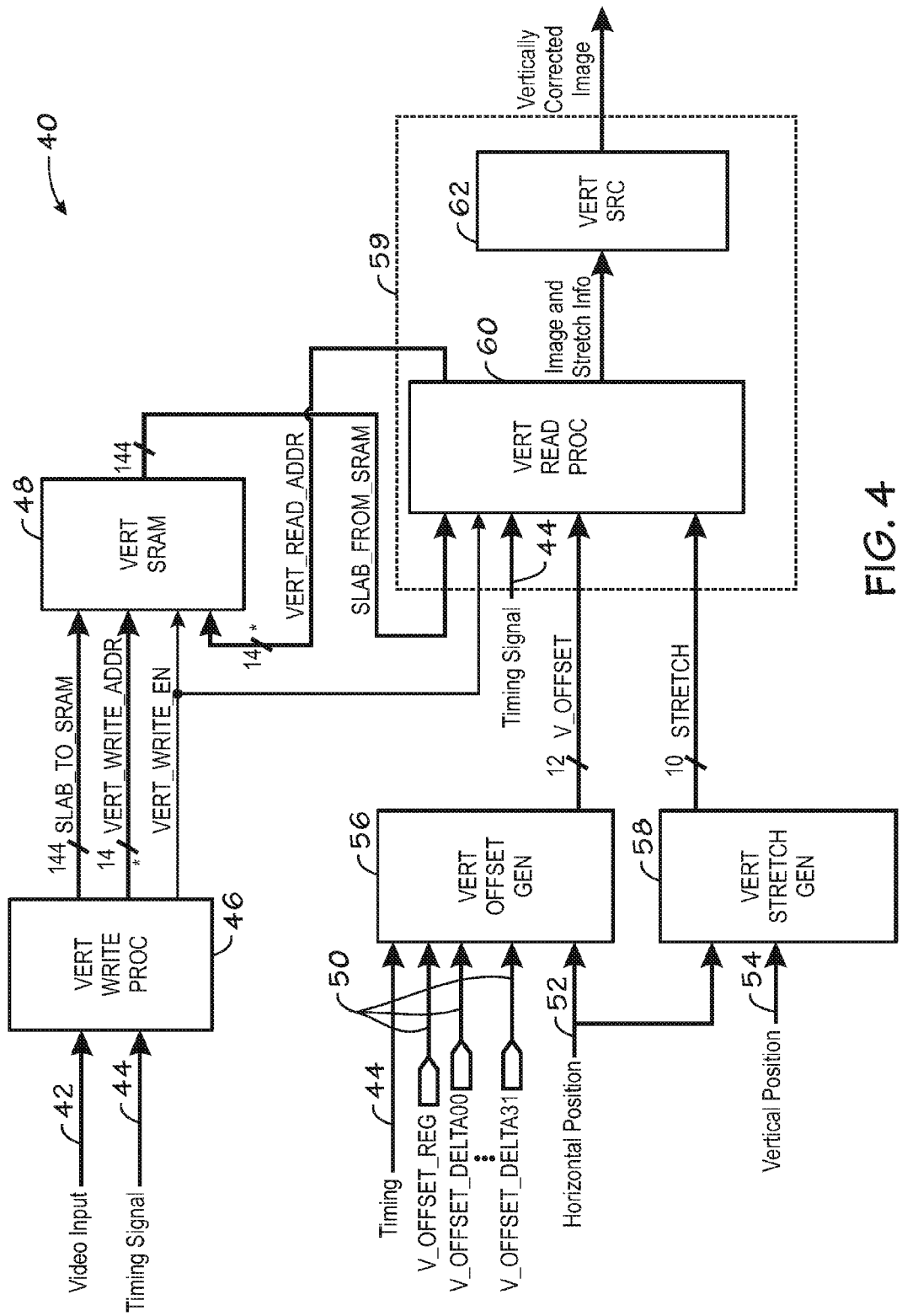
FIG. 4 is a diagram of an exemplary image processing unit incorporating an image correction block in accordance with an embodiment of the present invention.

FIG. 4 is a diagram of an exemplary image processing unit, in accordance with an embodiment of the present invention. For simplicity, like reference numerals have been used to designate those features previously described in reference to previous figures. The portion of the image processing unit 21 which corrects vertical geometric distortion is shown. Those of ordinary skill in the art will appreciate that the circuitry illustrated in FIG. 4 may be duplicated to correct horizontal geometric distortion. A video input 42 is received by the vertical write processor 46 which outputs the input to a vertical SRAM 48 for storage. This video input 42 being stored is the distorted image that is to be corrected. The write processor 46 controls the flow of image data and controls the storage of the image data into vertical SRAM 48.

The vertical offset generator 56 provides the vertical offsets for the grid points of the image. These offsets are the reference points for image correction. The vertical offset generator 56 receives the timing signal 44, vertical offset data 50 and the particular horizontal position 52 of the image pixel being corrected. The vertical offset data 50 may be set at the factory and retrieved from memory when needed. The vertical stretch generator 58 provides the vertical stretch coefficients needed for image correction. The vertical stretch generator 58 receives the horizontal position 52 and a vertical position 54 of the image pixel to be corrected as inputs.

The vertical offset generator 56 and the vertical stretch generator 58 output the offset and stretch data, respectively, to the vertical image correction processor 59. In one embodiment of the present invention, the vertical image correction processor 59 comprises a vertical read processor 60 and a vertical sample rate converter (SRC) 62.

The vertical read processor 60 receives vertical offset data, vertical stretch data, and a timing signal as inputs. Based on these three inputs, vertical read processor 60 determines where to find the image data it needs from the vertical SRAM 48. For example, the timing signal being input into the vertical read processor 60 may inform the vertical read processor 60 that the pixel corresponding to pixel coordinates (3, 5) is the one being processed. The vertical offset data and the vertical stretch data would inform the vertical read processor 60 that the image that should be at (3, 5) is located 2 pixels below where it should be based on inherent system distortion. The vertical read processor 60 then would determine that it should obtain the image pixel that is stored at pixel coordinates (3, 3) from the vertical SRAM 48 to output to the vertical SRC 62.

The vertical read processor 60 sends the image information it has obtained from the vertical SRAM 48, the vertical offset data, and the vertical stretch data to the vertical SRC 62. The vertical SRC 62 is configured to output a corrected image for image pixels regardless of whether the distortion has an integer or fractional value. In one embodiment of the present invention, the vertical read processor 60 obtains image pixels corresponding to four grid points surrounding the pixel to be corrected and outputs the four image pixels to the vertical SRC 62. The vertical SRC 62 would then interpolate the images to obtain the correct image that should be outputted.

For example, the timing signal being input into the vertical read processor 60 may tell the vertical read processor 60 that the pixel corresponding to pixel coordinates (3, 5) is the one being processed. The vertical offset data and the vertical stretch data would tell the vertical read processor 60 that the image that should be at (3, 5) is located 2.5 pixels below where it should be. However, the vertical SRAM 48 has only stored images corresponding to whole number pixels. The vertical read processor 60 then would obtain image pixels that are stored at the four grid points surrounding the pixel at (3, 5) from the vertical SRAM 48 to output to the vertical SRC 62. Based on the vertical stretch and vertical offset data, the vertical SRC 62 would interpolate the data from the four pixel coordinates to arrive at an image pixel that would be located at (3, 2.5) of the distorted image. This image pixel would be output by the vertical SRC as the image that should be displayed at pixel (3, 5).

Figure 5:
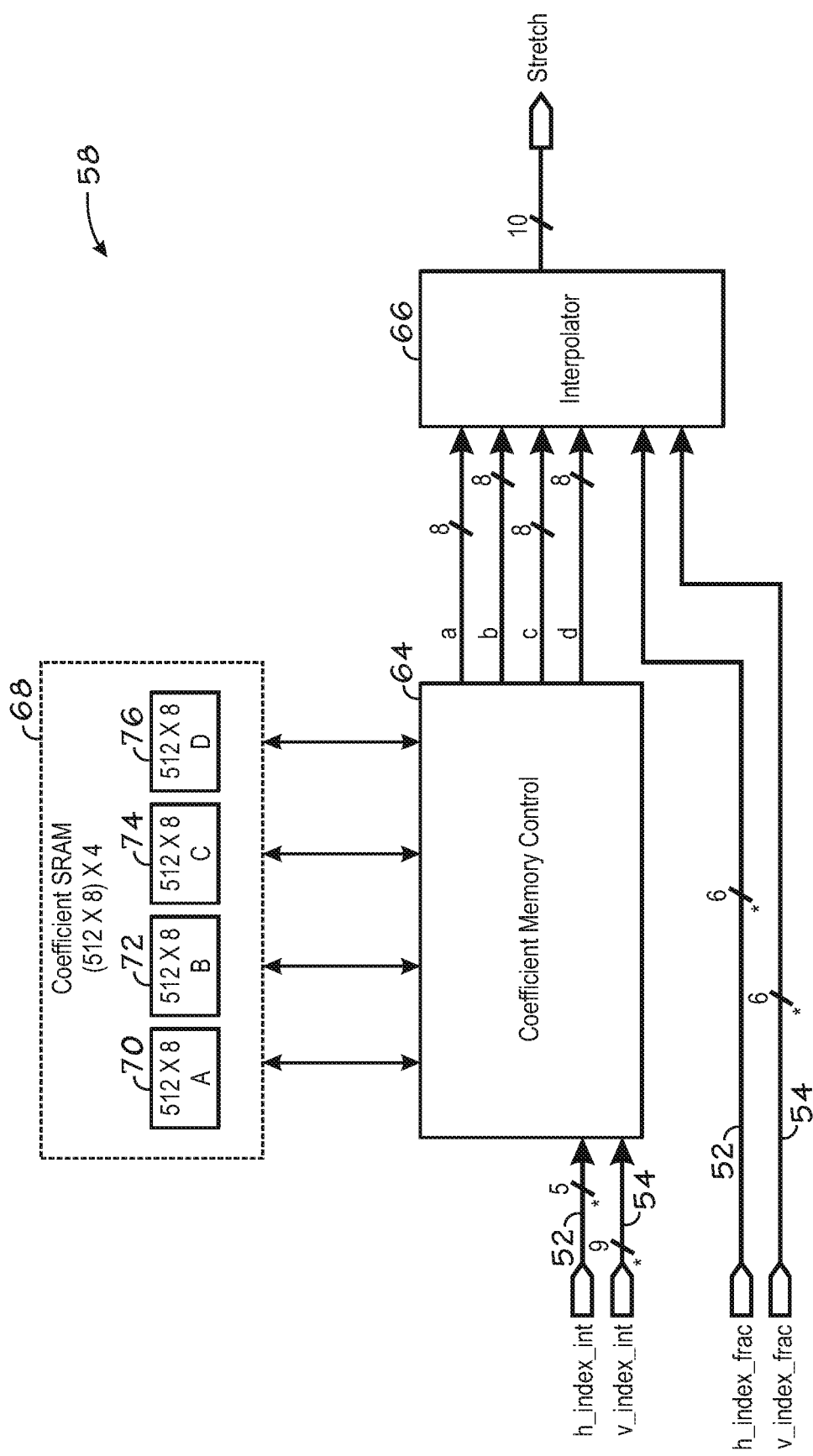
FIG. 5 is a diagram of a stretch coefficient generator in accordance with an embodiment of the present invention.

FIG. 5 is a diagram of an exemplary vertical stretch generator 58 in accordance with an embodiment of the present invention. A coefficient memory control 64 receives the horizontal position data 52 and the vertical position data 54. Based on these two inputs, the coefficient memory control 64 accesses a coefficient SRAM 68 which holds and stores the stretch coefficients. The coefficient memory control 64 retrieves four stretch coefficients that correspond to grid points surrounding the pixel position that the coefficient memory control 64 had received. The coefficient memory control 64 then outputs these coefficients to the interpolator 66. The interpolator 66 also receives the horizontal position data 52 and the vertical position data 54. Based on these inputs, the interpolator 66 calculates and outputs the appropriate stretch coefficient for the particular image section that is to be corrected.

Figure 6:
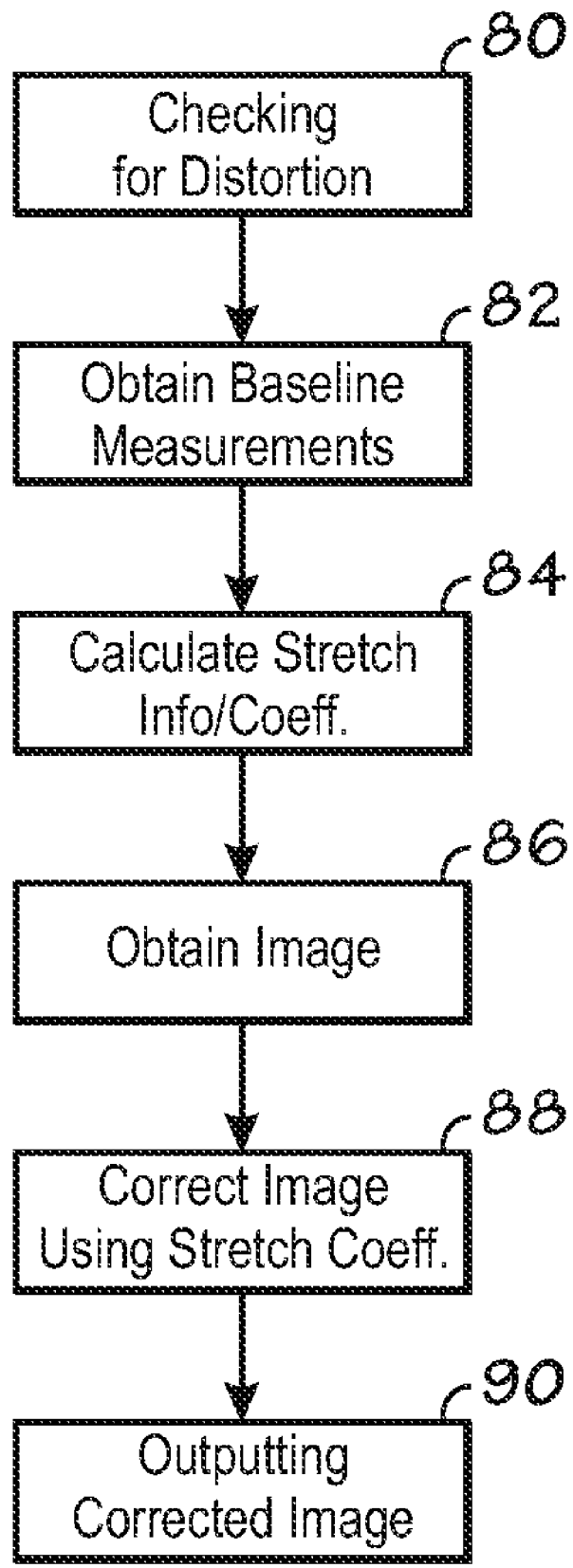
FIG. 6 is a flowchart illustrating an exemplary technique for correcting an image in accordance with an embodiment of the present invention.

FIG. 6 is a flowchart illustrating an exemplary technique for correcting a video image in accordance with an embodiment of the present invention. First, the distortion of the system is checked 80. If there is distortion of the system, baseline measurements for set portions of the image are obtained 82 and the baseline measurements are used to calculate the stretch coefficients for the set portions of the image 84. Then, the actual image is obtained 86 and corrected 88 using the baseline measurements and stretch coefficients previously obtained. Finally, the corrected image is output to the system 90. In one embodiment of the present invention, obtaining baseline measurements for set portions of the image includes obtaining offset coefficients for set portions of the image.

It will be appreciated that the technique described in FIG. 6 only encompasses one possible embodiment for a technique for image correction using the stretch coefficient method. In alternate embodiments, other techniques or configurations can be used.

While the invention may be susceptible to various modifications and alternative forms, specific embodiments have been shown by way of example in the drawings and will be described in detail herein. However, it should be understood that the invention is not intended to be limited to the particular forms disclosed. Rather, the invention is to cover all modifications, equivalents and alternatives falling within the spirit and scope of the invention as defined by the following appended claims.

What is claimed is:

1. A method of correcting video image distortion in a video system, comprising:
   retrieving baseline measurements for set portions of a display area, wherein the baseline measurements take into account distortions detected in the video system;
   determining stretch coefficients for the set portions of the display area;
   retrieving an image corresponding to the display area; and
   correcting positioning of a plurality of pixels of the image based on the baseline measurements and the stretch coefficients.

2. The method of claim 1, wherein retrieving baseline measurements for set portions of the display area comprises obtaining anchor point offset coefficients corresponding to grid points of the display area.

3. The method of claim 1, comprising interpolating a stretch coefficient for a pixel based on the stretch coefficients for the set portions of the display area.

4. The method of claim 1, wherein correcting positioning of the plurality of pixels of the image based on the baseline measurements and the stretch coefficients, comprises displaying a corrected image on a display device.

5. The method of claim 1, wherein retrieving the baseline measurements for the set portions of the display area comprises reading offset coefficients from a memory storing offset coefficients for each grid point in a grid of the display area.

6. The method of claim 1, comprising detecting the distortions in the video system and calculating the baseline measurements based on the distortions.

7. A method for displaying a corrected video image, comprising:
   determining positional data for a pixel of a video image;
   determining grid points that the pixel is located between based on the positional data, wherein the grid points are points of a grid block of a display area for the image;
   determining a grid point stretch coefficient corresponding to each of the grid points, wherein the grid point stretch coefficient corresponding to each of the grid points has been determined based on an anchor offset coefficient or a stretch coefficient for a neighboring grid point;
   determining a stretch coefficient for the pixel based on the positional data and the grid point stretch coefficient corresponding to each of the grid points; and
   displaying the pixel on a display in a corrected position based on the stretch coefficient for the pixel.

8. The method of claim 7, wherein the anchor offset coefficient is an offset coefficient for a leftmost point on one of a plurality of horizontal grid rows of the display area.

9. The method of claim 7, comprising calculating the grid point stretch coefficient for each of the grid points.

10. The method of claim 7, comprising reading the grid point stretch coefficients from a memory storing grid point stretch coefficients for each grid point in a grid of the display area.

11. The method of claim 7, wherein determining the positional data comprises determining pixel coordinates.

12. The method of claim 7, comprising displaying a plurality of pixels on the display in corrected positions based on a plurality of corresponding stretch coefficients for the plurality of pixels to display a corrected image.

13. The method of claim 12, comprising smoothing the corrected image without using smoothing circuitry.

14. The method of claim 7, wherein determining the positional data comprises determining a vertical position of the pixel.

15. An image processing unit, comprising:
   a stretch generator configured to determine positional data for a pixel of a video image, determine grid points that the pixel is located between based on the positional data, determine a grid point stretch coefficient corresponding to each of the grid points, and determine a stretch coefficient for the pixel based on the positional data and the grid point stretch coefficient corresponding to each of the grid points, wherein the grid points are points of a grid block of a display area for the image and wherein the grid point stretch coefficient corresponding to each of the grid points has been determined based on an anchor offset coefficient or a stretch coefficient for a neighboring grid point; and
   an image correction processor configured to display the pixel on a display in a corrected position based on the stretch coefficient for the pixel.

16. The image processing unit of claim 15, wherein the anchor offset coefficient is an offset coefficient for a leftmost point on one of a plurality of horizontal grid rows of the display area.

17. The image processing unit of claim 15, comprising an offset generator configured to calculate the grid point stretch coefficient for each of the grid points.

18. The image processing unit of claim 15, wherein the stretch generator is configured to read the grid point stretch coefficients from a memory storing grid point stretch coefficients for each grid point in a grid of the display area.

19. The image processing unit of claim 15, wherein the image correction processor is configured to display a plurality of pixels on the display in corrected positions based on a plurality of corresponding stretch coefficients for the plurality of pixels to display a corrected image.

20. The image processing unit of claim 15, wherein the image processing unit is configured to provide a smoothed corrected image without including smoothing circuitry.

* * * * *